United States Patent [19]

Kron

[11] 4,340,371
[45] Jul. 20, 1982

[54] UPPER AND LOWER ARM LOAD SIMULATOR

[75] Inventor: Gerald J. Kron, Conklin, N.Y.

[73] Assignee: The United States of America as represented by the Secretary of the Air Force, Washington, D.C.

[21] Appl. No.: 244,842

[22] Filed: Mar. 18, 1981

[51] Int. Cl.³ .............................................. G09B 9/00
[52] U.S. Cl. ..................................................... 434/59
[58] Field of Search ............................. 434/59; 3/1.1

[56] References Cited

U.S. PATENT DOCUMENTS

| | | | |
|---|---|---|---|
| 3,010,219 | 11/1961 | Schueller | 35/12 |
| 3,010,220 | 11/1961 | Schueller | 35/12 |
| 3,020,908 | 2/1962 | Daniels et al. | 128/26 |
| 3,074,669 | 1/1963 | Bohlin | 244/122 |
| 3,548,419 | 12/1970 | Katsuren | 3/1.1 |
| 3,631,542 | 1/1972 | Potter | 3/1.1 |
| 3,824,707 | 7/1974 | Ashworth et al. | 35/12 E |
| 3,883,900 | 5/1975 | Jerard et al. | 3/1.1 |
| 4,078,670 | 3/1978 | Francois et al. | 214/1 CM |
| 4,264,310 | 4/1981 | Ashworth et al. | 434/59 |

OTHER PUBLICATIONS

Christensen, K. K. et al. "Study to Determine Methods of Simulating g Effects", WADC Technical Note 58-314, Oct. 1958.

Primary Examiner—William H. Grieb
Attorney, Agent, or Firm—Donald J. Singer; Jacob N. Erlich

[57] ABSTRACT

An apparatus for simulating the loads acting on the arms of an aircraft pilot under high G conditions including a first torque motor of pancake-like configuration attached to the flight suit near the elbow area of the pilot. A second torque motor positioned near the pilot's waist operates through a tether line to apply a force to the shoulder of the pilot. With both torque motors operating, the upper and lower arms of the pilot are loaded in a manner to simulate the effect of acceleration loading of primary consequence, +Gz.

3 Claims, 4 Drawing Figures

UPPER AND LOWER ARM LOAD SIMULATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to apparatus for simulating the loads acting on the arms of an aircraft pilot under high G conditions and, more particularly, the invention is concerned with providing strategically positioned torque motors embedded within a flight suit to produce torque and thereby load the upper and lower arm of the pilot to simulate the effect of acceleration loading of primary consequences, +Gz.

It has been found that, in order to obtain useful G induced extremity loading stimuli, it is necessary to actually physically load the extremity in question. The acceleration effects operating on the upper arm are especially significant and lead to cross loading error wherein, in horizontal plane reaching movements in the presence of +Gz conditions, the hand falls short of its intended target. Thus, it can be seen that the mechanization of arm loading stimulti production requires equipment configured to exert force or load on the arm itself and the mechanization must allow load to be individually placed on the upper and lower arms.

Obviously the inherent high degree of arm mobility and the requirements to exercise this mobility in the course of piloting and operating the onboard system of a tactical aircraft severely constrain the arm loading concepts. It is not satisfactory to require that the arm be confined to a specific attitude or location in order to permit loading, rather the loader must "follow" arm motion operating when appropriate. Normally we would expect to find the upper arm in the neutral position which causes it to be approximately parallel to the spinal column. In reaching forward toward cockpit instruments or controls, shoulder flexion (elbow directed forward) up to 90° can be expected and occassionally may be accompanied by some adduction (elbow directed transversely across the body) or abduction (elbow directed transversely away from the body). Shoulder joint forward elevation (elbow directed upwards above the horizontal plane) is much less likely to occur in tactical aircraft due to the absense of controls above shoulder height.

Under high G conditions the mass of the upper arm, when in the neutral state, increases the load required to be suported by the shoulder joint and when in flexion, with or without adduction or abduction, increases not only load but the torque operating at the shoulder joint. The load is supported by the skeletal frame and torso muscular system governing this frame and is likely less noticable than the torque which affects the shoulder joint muscular system alone. Under worst case conditions wherein the arm is horizontally outstretched (zero degrees elbow flexion, 90° shoulder flexion) and assuming a 5 pound upper arm mass operating 5.5 inches from the shoulder joint and a 5 pound lower arm mass operating 17.5 inches from the shoulder joint, the Gz induced shoulder torque amounts to approximately 9.5 ft-lb/G. As the upper arm is rotated downwards toward the neutral position, the effective mass moment arm becomes less and the torque diminishes.

Under normal cockpit conditions we could expect to find the lower arm in near 90° flexion (parallel to the horizontal plane when the upper arm is in the neutral position) and may be rotated internally (transversely across the body) or in minor amounts externally (transversely away from the body). Maintaining lower arm at 90° flexion and raising the upper arm from the neutral point to 90° flexion causes the lower arm to be vertically oriented. This position as well as lower arm internal and external rotation from this position produce arm attitudes of a special nature which impose constraints affecting the design approach.

A typical reaching maneuver requires the upper arm to move in flexion various amounts from the neutral point toward 90° flexion while relaxing the lower arm a commensurate amount from 90° flexion toward zero degrees (arm horizontally extended forward from the shoulder). The lower arm is generally maintained somewhat parallel to the horizontal plane at the varied amounts of upper arm flexion. Under these conditions high G effects on the lower arm increase the load and torque. Considering the lower arm weight to be 5 pounds operating 6.5 inches from the elbow, 2.7 ft-lb/G of torque is experienced.

Initially it was felt that a suitable mechanization would employ thin long pneumatic bellows to drive an elbow hinge embedded within the flight suit and thus torque the lower arm with respect to the upper arm. This approach was abandoned due to the problems which arise in accounting for bellows spring rate force which is positionally dependent and would interact with subject movement of elbow flexion angle and unduly complicate the drive model. The characteristics of a torque motor in which torque or force, independent of position, is obtained is a much more suitable drive device. The recent introduction of samarium cobalt motors which display up to five times the torque of similarly sized Alnico motors makes a torque motor approach feasible. Suitable force can be generated by devices which are small enough to be contained on one's person.

SUMMARY OF THE INVENTION

The invention is concerned with providing an upper and lower arm load simulator wherein the lower arm torque is produced by a pancake torque motor embedded within a flight suit modified with additional zippers to permit ease of installation. The torque motor transmits torque to the arms via an arrangement of plastic stays and struts sewn between cloth layers of the flight suit. Upper arm loading is produced by a torque motor driven tether line embedded within the flight suit slightly above the waistline. This unit serves to create shoulder torque, load the upper arm, and retard forward movement of the elbow.

Accordingly, it is an object of the invention to provide an upper and lower arm load simulator wherein the lower arm load is applied by a pancake motor embedded in the flight suit near the elbow and the torque is transmitted to the arm by means of a series of plastic stays and struts sewn between cloth layers of the flight suit.

Another object of the invention is to provide an arm loading simulator wherein the upper arm load is applied by a torque motor positioned within the flight suit near and slightly above the waistline thereof to produce shoulder torque and load the upper arm as well as retard forward movement of the elbow.

Still another object of the invention is to provide an upper and lower arm load simulator wherein individual loads are placed on the upper and lower arm of the pilot during movement of the arm while simulating operation of the aircraft.

A further object of the invention is to provide an upper arm load simulator wherein a torque motor driven tether line is attached to a ball protruding from the back of the flight suit elbow. A tensile load cell is attached to the upper arm strut and connected via cable-in-guide-tube and bail to the tether line.

These and other objects, features and advantages will become more apparent after considering the following detailed description taken in conjunction with the annexed drawings and appended claims.

DESCRIPTION OF A PREFERRED EMBODIMENT

Figure 1:
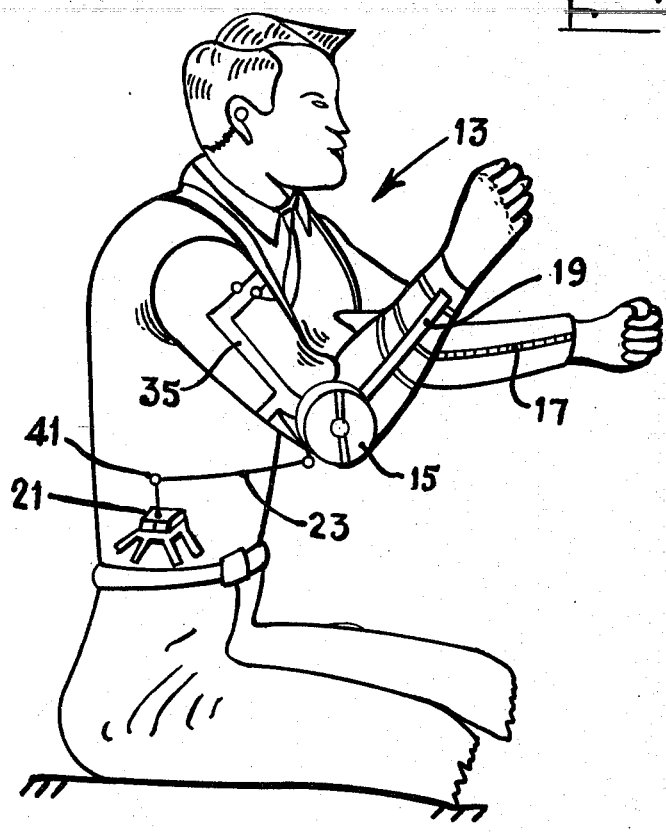
FIG. 1 is a general view of the upper and lower arm load simulator according to the invention in position on the flight suit of the pilot.

Referring now to the drawing figures in which like reference numerals refer to like elements in the several views, FIG. 1 shows a modified flight suit 13 which includes a pancake torque motor 15 embedded within the flight suit 13 further modified with additional zippers 17 to permit ease of entry. The torque motor 15 transmits torque to the arm via an arrangement of plastic stays and struts 19 sewn between the cloth layers of the flight suit 18. Upper arm loading is provided by a torque motor 21 which drives a tether line 23. The torque motor 21 is embedded within the flight suit 13 slightly above the waistline and serves to create shoulder torque, load the upper arm and retard the forward movement of the elbow. Although the torque motor 21 and tether line 23 assembly is shown positioned in the flight unit 13 where no special action is required to hook the tether 23 to the arm, the assembly could be seat frame mounted and the tether 23 secured after the pilot enters the cockpit. The former approach is preferable because one less unnatural pilot action is required and only an electrical connection to the flight suit 13 is necessary.

Figure 2:
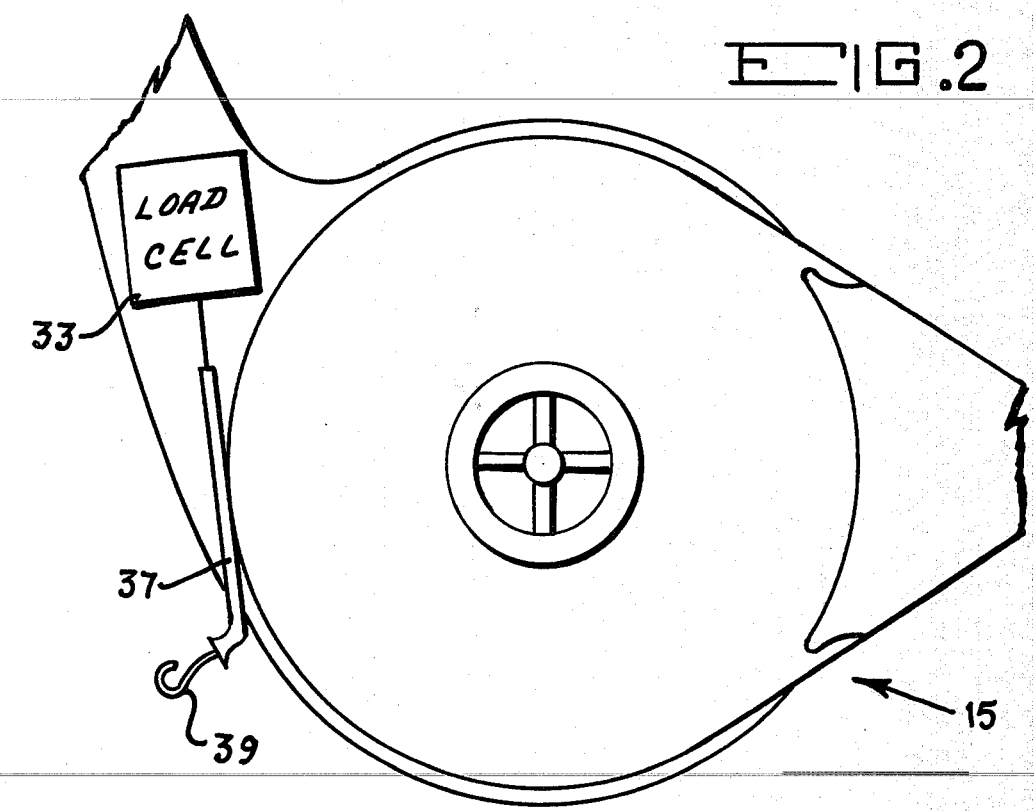
FIG. 2 is an enlarged side view of the lower area loader shown in FIG. 1 which includes the pancake torque motor and also shown is the tensile load cell attached to the upper arm strut with the cable-in-guide-tube arrangement.
Figure 3:
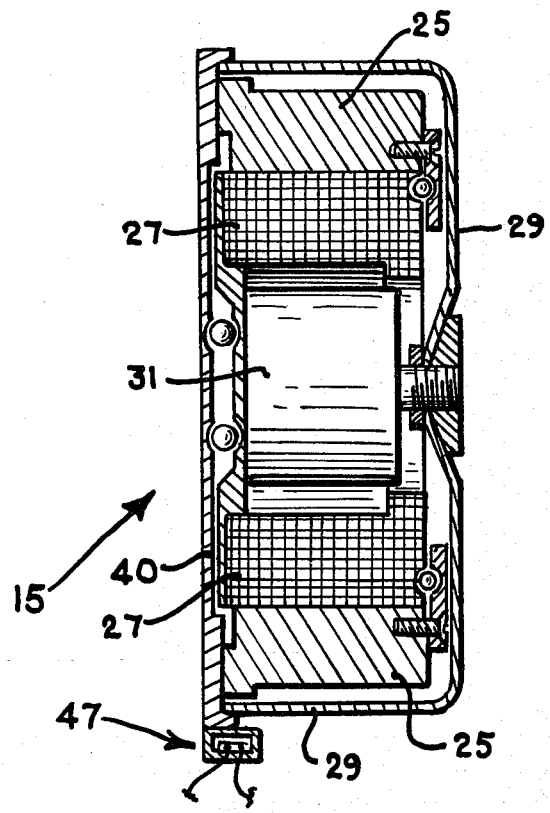
FIG. 3 is a view in cross-section of the pancake torque motor of FIG. 3 showing the stator and rotor assembly supported in the specially configured housing.

FIGS. 2 and 3 show details of the lower arm loader motor 14 which includes an Inland Motor samarium cobalt stator 25 and rotor 27 assembly supported in a housing 29 specifically designed for this application. The rotor 27 transmits torque to the outer housing 29 and lower arm strut and stays 19 through a servo loop torque load cell 31 which serves as an internal motor shaft. A 15 foot-pound torque load cell dimensionally fits this application and is used to close the lower arm loader servo looop.

Under +8 Gz loading conditions it is barely possible to raise the arm off its support area. Using this value as the maximum, elbow torque can approach 21.6 foot-pounds. The lower arm torque motor 15 is capable of 4.5 foot-pounds of peak torque thereby providing a simulation system loading scale factor of 20%. Maximum subject induced elbow velocity is taken as 3.9 rad/sec whereas maximum no load motor velocity is more than sufficient at 139 rad/sec. Likewise, motor no-load acceleration of over 10,000 rad/sec$^2$ is much higher than peak 16.0 rad/sec$^2$ elbow flexion acceleration.

Figure 4:
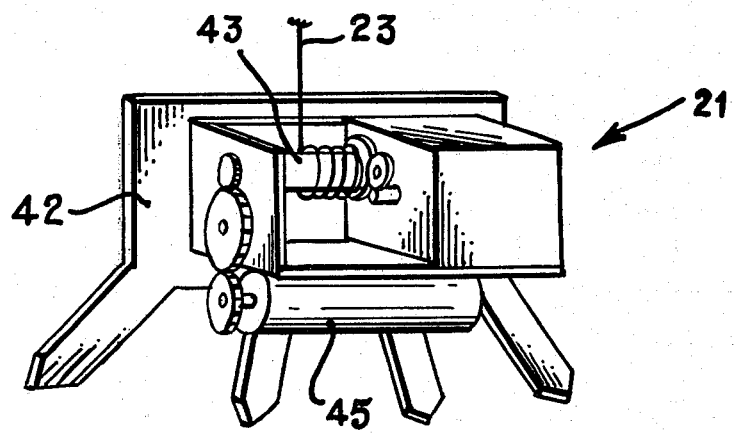
FIG. 4 is an illustration of the upper-arm loader including torque motor driven geared windlass which retracts the tether and applies force to the lower arm loader assembly.

In FIG. 2, the side view of the lower arm loader 15 shows the position of the upper-arm load cell 33. The tensile load cell 33 is attached to the upper arm strut 35 (shown in FIG. 1) and connected via cable-in-guide-tube 37 to a bail 39 protruding from the back of the flight suit 13 elbow some 14 inches from the shoulder. The load cell 33 is used to close the upper arm tether force servo loop. The monofilament tether 23 extends from an eyelet 41 in the side of the flight suit 13 approximately 14 inches below the shoulder joint and is attached to the bail 39. FIG. 4 is an illustration of the upper arm loader 21 which is secured within the sides of the flight suit 13 by means of the flexible backing 42 and to which the tether 23 is attached. The upper arm loader includes the torque motor 21 which drives a geared windlass 43 for retracting the tether 23 to apply force to the lower arm loader assembly. A small amount of bias torque is always present in order to keep the tether 23 taut and avoid fouling.

A ten turn follow up potentiometer 45 is further geared off the windlass 43 to provide a measure of tether line 23 extension which in turn permits computation of upper arm flexion or abduction angles. Two principle parameters are employed in sizing this torque assembly. First, under +8 Gz conditions when the upper and lower arm is horizontally extended, the torque at the shoulder is 76.6 ft-lbs. Maintaining the simulation device consistently scaled at 20 for both upper and lower arm torques reduces the 76.6 ft-lb maximum torque to 15.32 ft-lbs which requires a peak tether line force of 18.5 pounds. Assuming a maximum upper arm forward elevation of 25° (above horizontal) 23 inches of tether line is required and adopting a design goal of limiting windlass turns to 20 or less yields a windlass diameter of 0.366 inches and a maximum windlass torque of 54.3 oz-in.

The second parameter of importance is to select a gearing reduction factor which will satisfactorily relax motor torque requirements to reduce undue thermal effects yet provide a windlass rotational retract velocity which accommodates peak shoulder joint velocities. The peak shoulder joint velocity is taken as 175°/sec which can produce a maximum tether line velocity of approximately 42 inches/second. Selecting a gearing ratio of 3:1 (motor to windlass) reduces the peak motor torque requirement to 18.1 oz-in, and establishes a peak motor velocity requirement of 688 rad/second. The selected Inland Motor samarium cobalt motor is very compact and displays a peak stall torque of 30 oz-in and a maximum rotational velocity of 730 rad/second. The latter figure implies a maximum tether line velocity of 44 inches/second which is greater than that required by only a small margin. The configuration allows a theoretical no-load acceleration capability of 6535 in/sec$^2$, at the tether line which is well above the 182 in/sec$^2$ anticipated as resulting from peak shoulder joint acceleration of 750°/sec².

As previously mentioned, +Gz load induced torque experienced at the shoulder and elbow joints is most pronouncedly experienced when the arm segment in question is maintained in the horizontal plane wherein the effective mass moment arm is largest. A knowledge of the attitude of these arm segments is therefore useful in increasing the fidelity of the drive signals provided the torque motors. It should also be apparent that there exists an interrelationship between lower and upper arm loaders in addition to the obvious fact that the upper arm loader must account for the load imposed by the lower arm on the upper arm. In lower arm attitudes where the lower arm torque 15 is activated to impress a load on the lower arm it is necessary to commensurately increase the tension in the upper arm loader tether 23 to appropriately represent the lower arm mass moment arm effect upon the shoulder joint.

Previously, it was noted that an arm attitude in which the upper arm is directed forward (90° shoulder joint flexion) and the lower arm is directed upwards with respect to the upper arm (90° elbow flexion) presents special problems. If the lower arm is angled forward from this position (decrease in elbow flexion) the lower arm loader torque will appropriately increase under +Gz conditions. However, should the lower arm be rotated internally from the upright position the plane of elbow flexion moves from the vertical plane toward the horizontal plane. Lower arm loader torque under these conditions will produce forces on the lower arm with significant horizontal components which are, of course, inappropriate under +Gz conditions. The higher the elbow is held (large upper arm flexion angles), the larger are the unwanted horizontal components.

For these reasons it is appropriate to include an angular position follow-up device within the elbow (lower arm) loader. Forces and torques which are a function of elbow flexion may then be computed appropriately and displayed at both elbow and shoulder joint. The follow-up device is formd as a simple potentiometer wherein the wiper is affixed to rotor 27 and the windings to be wiped are located on the inside of the backplate 40. The remaining idiosyncrasies which could still occur when the upper arm is raised to a horizontal position and elbow flexion causes the lower arm to be raised to the region of being vertically oriented and from this position the lower arm is rotated internally (transversely across the body) or externally (transversely away from the body) can be eliminated by incorporating mercury or gravity switches 47 which prevents lower arm loader drive when such internal or external rotations exist.

Although the invention has been illustrated in the accompanying drawings and described in the foregoing specification in terms of a preferred embodiment thereof, the invention is not limited to this embodiment. It will be apparent to those skilled in the art that the hereinbefore described upper and lower arm load simulator can be used in other operations where it is desirable to measure the forces on limbs while performing specific operational tasks. Also, it should be noted that certain changes, modifications and substitutions can be made in the construction details of the invention without departing from the true spirit and scope of the appended claims.

Having thus set forth the nature of my invention, what I claim and desire to secure by Letters Patent of the United States is:

1. An apparatus for use with a flight suit to simulate the loads acting on the arms of an aircraft pilot under high G conditions comprising, a first torque motor of pancake-like configuration attached to the flight suit near the elbow, a plurality of plastic stays and struts positioned on the lower arm portion of the flight suit and operatively attached to said first torque motor, a second torque motor attached to the flight suit near the waistline, an upper arm strut positioned on the flight suit between the shoulder and elbow thereof, a tether line disposed between said second torque motor and the elbow of the flight suit, and a geared windlass operatively connected to said second torque motor whereby the energization of said second torque motor causes said tether line to wind around said geared windlass and thereby load the upper arm to create shoulder torque and retard forward movement of the elbow while the energization of said first torque motor through said plastic stays and struts produces torque at the elbow.

2. The apparatus for use with a flight suit defined in claim 1 wherein said first torque motor of pancake-like configuration includes a cup-shaped housing, a stator attached to the inner wall of said housing, a rotor disposed in said housing for rotatable movement therein, and an internal motor shaft positioned within said rotor whereby torque is transmitted by said rotor through said housing to said lower arm stays and struts.

3. The apparatus for use with a flight suit defined in claim 1 wherein a cable-in-guide-tube is operatively connected between said tether line from said second torque motor and a load cell affixed to the flight suit in the upper arm area.

* * * * *